United States Patent
Lemmers, Jr. et al.

(10) Patent No.: US 9,645,586 B2
(45) Date of Patent: May 9, 2017

(54) PRESSURE REGULATING VALVE ASSEMBLY

(71) Applicant: Hamilton Sundstrand Corporation, Charlotte, NC (US)

(72) Inventors: Glenn C. Lemmers, Jr., Loves Park, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 98 days.

(21) Appl. No.: 14/193,175

(22) Filed: Feb. 28, 2014

(65) Prior Publication Data

US 2015/0068620 A1 Mar. 12, 2015

Related U.S. Application Data

(60) Provisional application No. 61/875,816, filed on Sep. 10, 2013.

(51) Int. Cl.
*F16K 1/44* (2006.01)
*G05D 16/10* (2006.01)

(52) U.S. Cl.
CPC .......... *G05D 16/10* (2013.01); *Y10T 137/777* (2015.04); *Y10T 137/86775* (2015.04)

(58) Field of Classification Search
CPC .................. Y10T 137/86791; F16K 29/00
USPC ..... 251/62, 63.5; 137/454.6, 625.34–625.37; 310/53, 54
See application file for complete search history.

(56) References Cited

U.S. PATENT DOCUMENTS

| | | | | |
|---|---|---|---|---|
| 3,807,022 | A | * | 4/1974 | Von Bredow .......... B21D 51/04 29/707 |
| 4,091,832 | A | * | 5/1978 | Snyder et al. .................. 137/72 |
| 4,291,718 | A | * | 9/1981 | Sanin et al. ............... 137/87.06 |
| 4,778,351 | A | * | 10/1988 | Sowards et al. ............. 417/295 |
| 4,795,129 | A | * | 1/1989 | Clark .............................. 251/62 |
| 5,899,435 | A | * | 5/1999 | Mitsch et al. ................. 251/62 |
| 5,971,353 | A | * | 10/1999 | Johnson ...................... 251/63.6 |
| 2010/0283333 | A1 | * | 11/2010 | Lemmers et al. ............. 310/54 |
| 2013/0233396 | A1 | * | 9/2013 | Lee et al. ........................ 137/12 |

* cited by examiner

*Primary Examiner* — R. K. Arundale
(74) *Attorney, Agent, or Firm* — Cantor Colburn LLP

(57) ABSTRACT

A pressure regulating valve assembly includes a housing. Also included is a valve sleeve mounted within a bore of the housing, the valve sleeve having a first portion and a second portion, the second portion having a diameter less than the first portion and received in a sense piston bore of the housing. Further included is a valve spool mounted within the valve sleeve. Yet further included is a sense piston disposed within the second portion of the valve sleeve. Also included is a damping orifice extending through an end portion of the second portion of the valve sleeve.

13 Claims, 3 Drawing Sheets

US 9,645,586 B2

PRESSURE REGULATING VALVE ASSEMBLY

CROSS-REFERENCE TO RELATED APPLICATIONS

This patent application claims priority to U.S. Provisional Application No. 61/875,816, filed Sep. 10, 2013, which is incorporated herein by reference in its entirety.

FEDERAL RESEARCH STATEMENT

This application was made with U.S. Government support under Contract No. N00019-02-C-3002 awarded by the Joint Procurement Office. The U.S. Government may have certain rights in this invention.

BACKGROUND OF THE INVENTION

The invention relates to a fluid regulating valve and, more particularly, to a pressure regulating valve assembly.

Numerous mechanical systems, such as those on an aircraft, require a fluid (e.g., oil) to be delivered to several locations within the system to ensure continued efficient operation of the system and associated components. A pressure regulating valve is employed on an oil flow line to control the volume of oil being delivered to downstream users dependent on the pressure of the oil. In some aircraft systems, pressure instability has been observed due to the interaction of aircraft system plumbing hydraulic resonance and the pressure regulating valve damping. High pressure pulsations within the system may cause damage to system and/or less efficient operation of the system.

BRIEF DESCRIPTION OF THE INVENTION

According to one embodiment, a pressure regulating valve assembly includes a housing. Also included is a valve sleeve mounted within a bore of the housing, the valve sleeve having a first portion and a second portion, the second portion having a diameter less than the first portion and received in a sense piston bore of the housing. Further included is a valve spool mounted within the valve sleeve. Yet further included is a sense piston disposed within the second portion of the valve sleeve. Also included is a damping orifice extending through an end portion of the second portion of the valve sleeve.

According to another embodiment, a valve sleeve for use in a pressure regulating valve includes a first portion having a first diameter. Also included is a second portion having a second diameter, wherein the second diameter is less than first diameter. Further included is at least one fluid inlet port disposed at a first axial location of the valve sleeve and at least one fluid outlet port disposed at a second axial location of the valve sleeve, wherein the at least one fluid inlet port comprises a substantially triangular geometry. Yet further included is a damping orifice extending through an end portion of the second portion of the valve sleeve.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
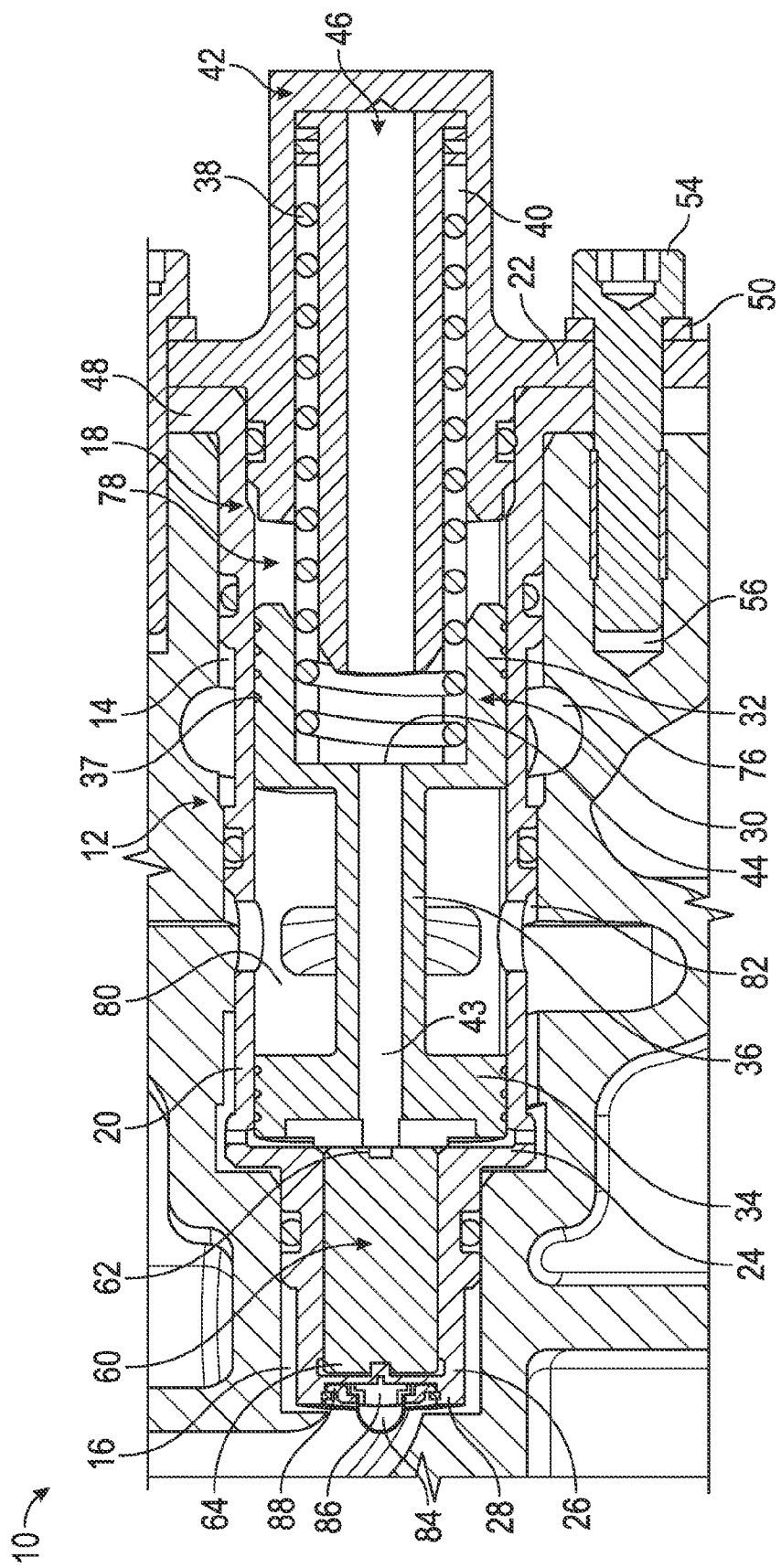
FIG. 1 is a cross-sectional view of a pressure regulating valve assembly.

Referring to FIG. 1, a cross-sectional view of a pressure regulating valve assembly 10 is shown. The pressure regulating valve assembly 10 may be employed in a variety of applications, including aircraft applications, for example. In one embodiment, the pressure regulating valve assembly 10 is part of an oil supply line and facilitates delivery of oil to various components of an associated system. Although oil is briefly discussed above, it is to be appreciated that other fluids may benefit from the pressure regulating valve assembly 10 described herein.

The pressure regulating valve assembly 10 is operatively coupled to, and substantially disposed within, a housing 12. The housing 12 includes a main bore 14 and a sense piston bore 16. The cross-sectional area of the sense piston bore 16 is smaller than the cross-sectional area of the main bore 14. Use of the term "cross-sectional area" is employed to refer to any cross-sectional geometry of the bores, but typically a circular geometry is included. As such, for purposes of discussion, use of the term "diameter" is used herein to describe relative dimensions of the bores and other components described below.

Figure 2:
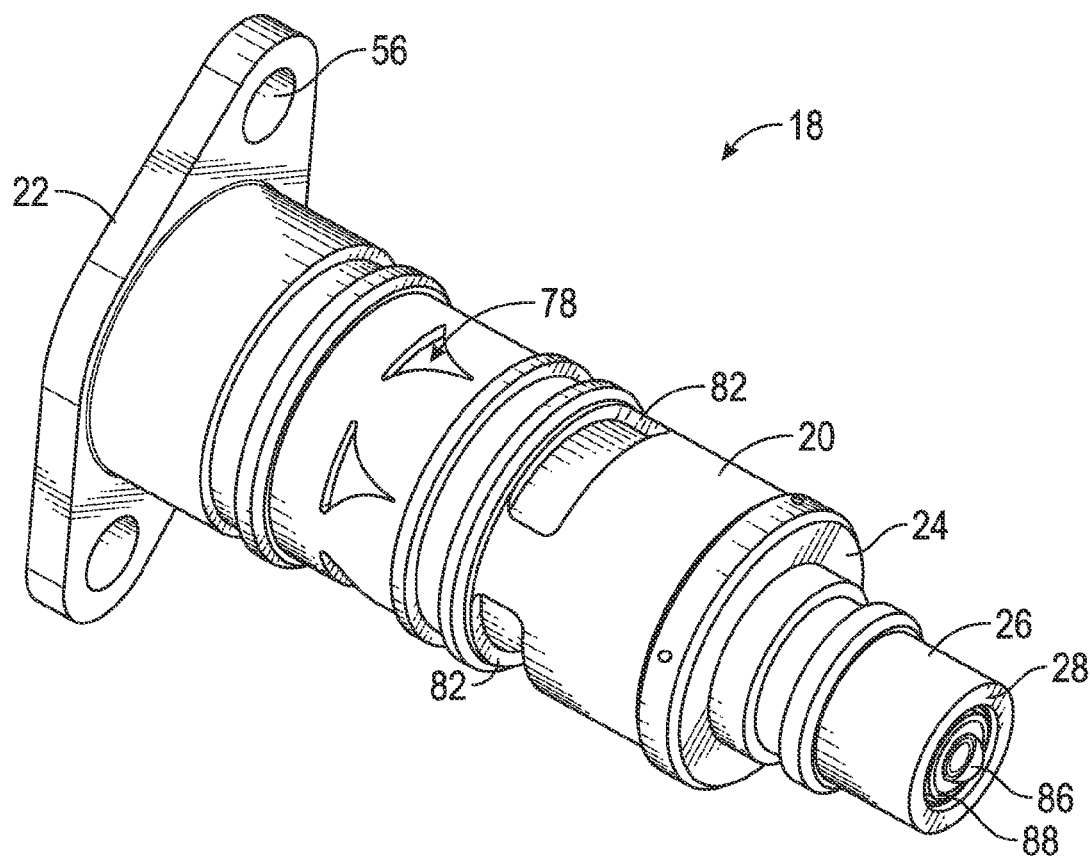
FIG. 2 is a perspective view of a valve sleeve of the pressure regulating valve assembly.

Disposed within the main bore 14 and the sense piston bore 16 is a valve sleeve 18 (also shown in FIG. 2). The valve sleeve 18 generally corresponds to the geometry of the main bore 14 and the sense piston bore 16, with a radial clearance typically present between an inner surface of the bores and an outer surface of the valve sleeve 18, thereby forming an annulus therebetween. In particular, the valve sleeve 18 includes a first portion 20 extending from a first sleeve end 22 to a radially extending ledge 24. The first portion 20 is disposed within the main bore 14 of the housing 12. A second portion 26 of the valve sleeve 18 extends from the radially extending ledge 24 to a second sleeve end 28. The second portion 26 is disposed within the sense piston bore 16. The first portion 20 includes a first diameter that is greater than a second diameter of the second portion 26.

Figure 4:
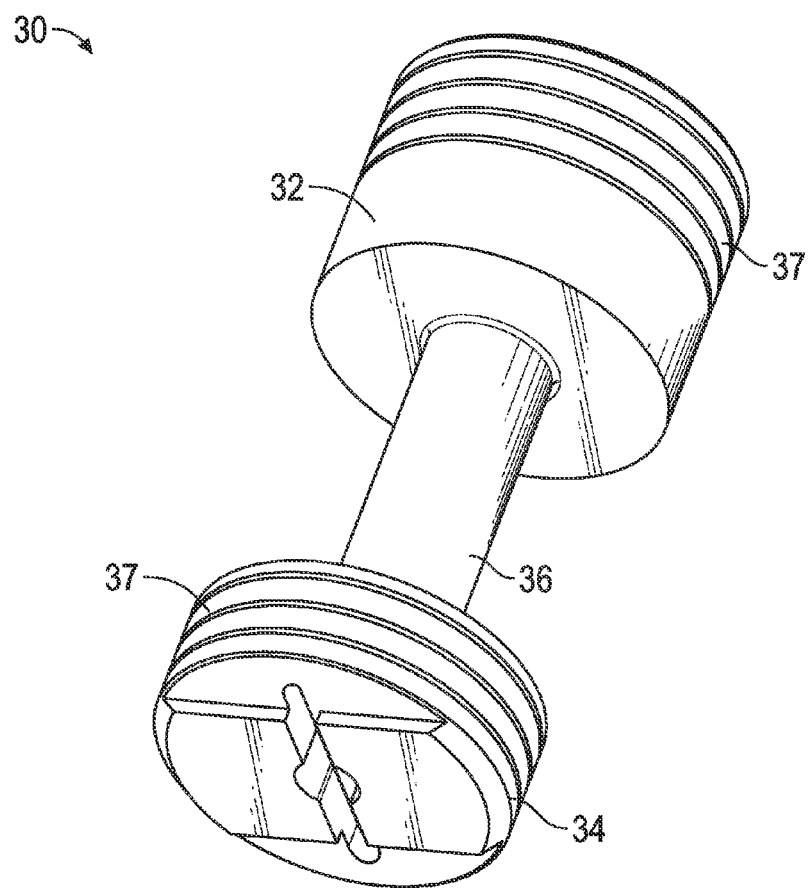
FIG. 4 is a perspective view of a valve spool of the pressure regulating valve assembly.

A valve spool 30 (also shown in FIG. 4) is disposed within the valve sleeve 18 and is displaceable in a translating manner within the valve sleeve 18. The valve spool includes a first spool portion 32, a second spool portion 34 and a spool neck portion 36 extending between the first spool portion 32 and the second spool portion 34. The spool neck portion 36 has a diameter smaller than the diameter(s) of the first spool portion 32 and the second spool portion 34. Either or both of the first spool portion 32 and the second spool portion 34 include a plurality of circumferential grooves 37. Each of the plurality of circumferential grooves 37 are axially spaced from each other along the first spool portion 32 and/or the second spool portion 34.

The valve spool 30 is biased toward the second portion 26 of the valve sleeve 18 with a spring 38 disposed in a spring cavity 40 between an end cover 42 of the housing 12 and a portion 44 of the valve spool 30. A spool through hole 43 extending axially through the valve spool 30 is configured to vent the spring cavity 40. As shown, the spring 38 is typically arranged along an outer surface of a spring guide 46 that is coupled to the end cover 42. The valve sleeve 18 includes a sleeve flange 48 and the end cover 42 includes a cover flange 50 each configured to receive one or more mechanical fasteners 54 through holes 56 therein for securing the end cover 42 and the valve sleeve 18 to the housing 12.

Figure 5:
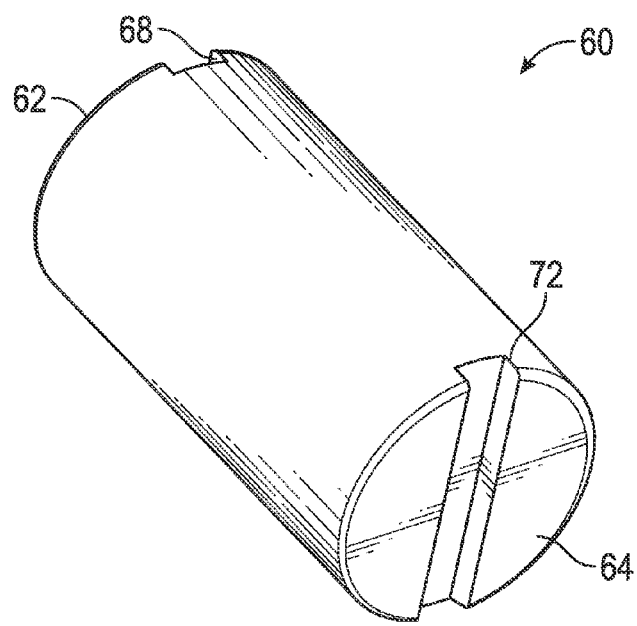
FIG. 5 is a perspective view of a sense piston of the pressure regulating valve assembly.

A sense piston 60 (also shown in FIG. 5) is located within the sense piston bore 16 and more specifically within the second portion 26 of the valve sleeve 18. The sense piston 60 extends from a first end 62 to a second end 64 and is configured to abut the valve spool 30 at the second end 64 of the sense piston 60. The sense piston 60 also includes at least one slot to avoid a cohesive bond with the valve sleeve 18. In one embodiment, the sense piston 60 includes a first slot 68 located within the first end 62 of the sense piston 60 and a second slot 72 located within the second end 64 of the sense piston 60.

Figure 3:
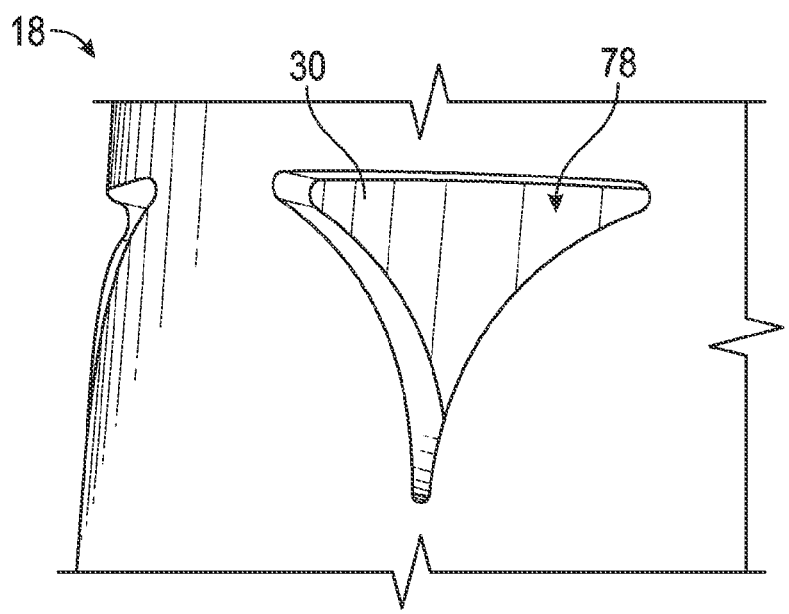
FIG. 3 is an enlarged view of a fluid inlet port of the valve sleeve.

In operation, a relatively high pressure fluid, such as oil, enters a chamber 76. The fluid enters the chamber 76 through at least one, but typically a plurality of fluid inlet ports 78 located at a first axial location of the valve sleeve 18. The fluid can move through other ports into an outlet chamber 80 and subsequently out of the outlet chamber through at least one, but typically a plurality of fluid outlet ports 82 located at a second axial location of the valve sleeve 18. In the embodiment shown, the plurality of fluid inlet ports 78 are of a substantially triangular geometry (FIG. 3).

Relatively high pressure fluid is also delivered into a side port 84 and biases the sense piston 60 toward the valve sleeve 30. However, this movement is dampened by the inclusion of a damping orifice 86 extending through the second sleeve end 28 of the valve sleeve 18. In one embodiment, the damping orifice 86 comprises a diameter ranging from about 0.001 inches to about 0.020 inches, with the diameter typically ranging from about 0.005 inches to about 0.015 inches. Operatively coupled to the valve sleeve 18 proximate the damping orifice 86 is a filtering screen 88 that is configured to ensure a filtered flow of fluid. Advantageously, the damping orifice 86 results in less temperature dependent damping chamber pressures and compressed trapped air volumes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pressure regulating valve assembly comprising: a housing defining a side port; a valve sleeve mounted within a bore of the housing, the valve sleeve having a first portion that extends from a first sleeve end to a radially extending ledge and a second portion that extends from the radially extending ledge to a second sleeve end, the second portion having a diameter less than the first portion and received in a sense piston bore of the housing, the valve sleeve defines at least one fluid inlet port disposed at a first axial location of the valve sleeve, at least one fluid outlet port disposed at a second axial location of the valve sleeve spaced apart from the first axial location, and an orifice that extends through the first portion and is disposed at a third axial location of the valve sleeve that is spaced apart from the first axial location and the second axial location; a valve spool mounted within the first portion of the valve sleeve; a sense piston disposed within the second portion of the valve sleeve, the sense piston including a first slot disposed on a first end face and a second slot disposed on a second end face, the side port receives a high pressure fluid that biases the sense piston towards the valve sleeve; and a damping orifice disposed proximate the side port, the damping orifice extending through an end portion of the second portion of the valve sleeve.

2. The pressure regulating valve assembly of claim 1, further comprising a filtering screen operatively coupled to the valve sleeve proximate the damping orifice.

3. The pressure regulating valve assembly of claim 1, wherein the damping orifice comprises a diameter from about 0.001 inches to about 0.020 inches.

4. The pressure regulating valve assembly of claim 1, wherein the damping orifice comprises a diameter from about 0.005 inches to about 0.015 inches.

5. The pressure regulating valve assembly of claim 1, wherein the at least one fluid inlet port comprises a substantially triangular geometry.

6. The pressure regulating valve assembly of claim 1, wherein the valve spool comprises a first spool portion, a second spool portion and a spool neck portion extending between the first spool portion and the second spool portion, the spool neck portion having a diameter less than the first spool portion and the second spool portion.

7. The pressure regulating valve assembly of claim 6, further comprising a plurality of circumferential grooves extending around the first spool portion and the second spool portion, the plurality of circumferential grooves axially spaced from each other.

8. The pressure regulating valve assembly of claim 1, further comprising a spool through hole extending axially through the valve spool and configured to vent a spring cavity.

9. The pressure regulating valve assembly of claim 8, further comprising a spring disposed in the spring cavity between an end cover of the housing and a portion of the valve spool, the spring configured to bias the valve spool away from the end cover.

10. A valve sleeve for use in a pressure regulating valve comprising:
  a first portion having a first diameter, the first portion extends from a first sleeve end defining a flange having a through hole and extends to a radially extending ledge;
  a second portion having a second diameter that receives a sense piston, the second portion extends from the radially extending ledge to a second sleeve end, wherein the second diameter is less than first diameter, the sense piston extends from a first end to a second end, the second end of the sense piston abuts a valve spool having a spool neck portion extending between a first spool portion and a second spool portion, the spool neck portion has a diameter smaller than the diameters of the first spool portion and the second spool portion;
  a fluid inlet port disposed at a first axial location of the valve sleeve, a fluid outlet port disposed at a second axial location of the valve sleeve, and a side port disposed proximate an end portion of the second portion of the valve sleeve; and a damping orifice, disposed proximate the side port, the damping orifice extending through the end portion of the second portion of the valve sleeve.

11. The pressure regulating valve assembly of claim 10, further comprising a filtering screen operatively coupled to the valve sleeve proximate the damping orifice.

12. The pressure regulating valve assembly of claim 10, wherein the damping orifice comprises a diameter from about 0.001 inches to about 0.020 inches.

13. The pressure regulating valve assembly of claim 10, wherein the damping orifice comprises a diameter from about 0.005 inches to about 0.015 inches.

* * * * *